US009622493B2

(12) United States Patent
Kristensen et al.

(10) Patent No.: US 9,622,493 B2
(45) Date of Patent: Apr. 18, 2017

(54) FISH PROCESSING MACHINE AND A METHOD ENABLING THAT FISH CAN BE PROCESSED THROUGH THE MOUTH

(71) Applicant: Kroma A/S, Skive (DK)

(72) Inventors: Ivan Kristensen, Viborg (DK); Daniel Braad Jorgensen, Silkeborg (DK)

(73) Assignee: Kroma A/S, Skive (DK)

( * ) Notice: Subject to any disclaimer, the term of this patent is extended or adjusted under 35 U.S.C. 154(b) by 0 days.

(21) Appl. No.: 15/030,167

(22) PCT Filed: Oct. 22, 2014

(86) PCT No.: PCT/DK2014/050345
§ 371 (c)(1),
(2) Date: Apr. 18, 2016

(87) PCT Pub. No.: WO2015/062610
PCT Pub. Date: May 7, 2015

(65) Prior Publication Data
US 2016/0249629 A1 Sep. 1, 2016

(30) Foreign Application Priority Data
Oct. 30, 2013 (DK) .......................... PA 2013 70633

(51) Int. Cl.
*A22C 25/14* (2006.01)
(52) U.S. Cl.
CPC .......... *A22C 25/145* (2013.01); *A22C 25/147* (2013.01)
(58) Field of Classification Search
CPC ........ A22C 21/06; A22C 25/14; A22B 5/0094
(Continued)

(56) References Cited

U.S. PATENT DOCUMENTS 3,518,719 A * 7/1970 Anderson ............ A22C 25/025
452/195
5,098,334 A 3/1992 Molaug
(Continued)

FOREIGN PATENT DOCUMENTS

GB 1486767 A 9/1977
JP 2002034441 A 2/2002

OTHER PUBLICATIONS

Machine Translation of JP2002034441A by Lexis Nexis Total Patent on Apr. 14, 2016.
(Continued)

*Primary Examiner* — Richard Price, Jr.
(74) *Attorney, Agent, or Firm* — Woodard, Emhardt, Moriarty, McNett &

(57) ABSTRACT

Disclosed is a fish processing machine (1) including a mouth access providing instrument (2) enabling that a fish (3) can be processed through the mouth (4) of the fish (3). The mouth access providing instrument (2) includes a mouth penetrating instrument (5) for penetrating the mouth (4) of the fish (3) and a displacement instrument (6) for displacing the mouth penetrating instrument (5) or the fish (3) in relation to each other to place the mouth penetrating instrument (5) in the mouth (4) of the fish (3). The mouth access providing instrument (2) also includes a sensor (7) for detecting the location of the mouth (4) of the fish (3) and an adjustment instrument (8) for adjusting the position of the mouth penetrating instrument (5) or the fish (3) in relation to output from the sensor (7).
A method for enabling that fish (3) can be processed through the mouth (4) is also disclosed.

15 Claims, 5 Drawing Sheets

(58) Field of Classification Search
USPC ........ 452/106–109, 120, 121, 123, 116, 113, 452/114, 149, 163
See application file for complete search history.

(56) References Cited

U.S. PATENT DOCUMENTS

| | | | | |
|---|---|---|---|---|
| 6,001,001 | A * | 12/1999 | IslamRaja | ............... B24B 37/30 |
| | | | | 451/246 |
| 7,179,163 | B1 * | 2/2007 | Vedsted | ............... A22C 25/147 |
| | | | | 452/121 |
| 2004/0014416 | A1 | 1/2004 | Grobeholz | |
| 2005/0153645 | A1 * | 7/2005 | Ketels | .................... A22C 25/00 |
| | | | | 452/162 |
| 2010/0048115 | A1 * | 2/2010 | Shimachi | ............ A22C 25/147 |
| | | | | 452/149 |

OTHER PUBLICATIONS

Written Opinion issued Nov. 14, 2014 in related PCT/DK2014/050345.

\* cited by examiner

FISH PROCESSING MACHINE AND A METHOD ENABLING THAT FISH CAN BE PROCESSED THROUGH THE MOUTH

FIELD OF THE INVENTION

The invention relates to a fish processing machine comprising mouth access providing means enabling that a fish can be processed through the mouth of the fish and a method enabling that fish can be processed through the mouth.

BACKGROUND

Automated processing of fish where the fish is processed through the abdomen is well-known in the art. And since particularly the liver and spawn often are valuable commodities it is also known to remove the viscera through the abdomen substantially without damaging the viscera, so that this may undergo further processing separately. However, when the viscera is removed through the abdomen it is difficult to sever the oesophagus properly without damaging the viscera and a substantial part of the oesophagus therefore remains in the gutted fish. The oesophagus is not pleasant to eat and it is therefore not desirable to leave parts of it in the processed fish.

From U.S. Pat. No. 5,098,334 it is therefore known to place a rod in the mouth of the fish through which an oesophagus cutting tool can be inserted and cut the oesophagus where it is attached in the throat of the fish. However, no two fish are identical and it is therefore difficult to ensure that the rod is placed securely in the mouth of the fish every time.

An object of the invention is therefore to provide for an advantageous technique for processing fish.

SUMMARY

The invention provides for a fish processing machine comprising mouth access providing means enabling that a fish can be processed through the mouth of the fish. The mouth access providing means includes mouth penetrating means for penetrating the mouth of the fish and displacement means for displacing the mouth penetrating means or the fish in relation to each other to place the mouth penetrating means in the mouth of the fish. The mouth access providing means further comprises sensor means for detecting the location of the mouth of said fish and adjustment means for adjusting the position of the mouth penetrating means or the fish in relation to output from the sensor means.

Providing the mouth access providing means with sensor means detecting the location of the mouth of the fish and using these information to adjust the position of the mouth penetrating means or the fish is advantageous in that it hereby is possible to make the mouth penetrating means hit the mouth of the fish even if the fish entering the fish processing machine are different—i.e. even though the position of the fish mouth varies.

The term "mouth penetrating means" is in this context to be understood as any kind of rod, cone, tube, pipe, stick, guide or similar mouth penetrating device suitable for automated penetration of the mouth of fish.

It should also be noted that in this context the term "displacement means" should be understood as any kind of actuator, motor, solenoid or similar displacement device suitable for displacing mouth penetrating means in a fish processing machine.

The term "sensor means" should in this context be understood as any kind of proximity switch, scanner, camera, radar, mechanical switch, inductive switch, capacitive switch or similar sensor suitable for automated detection of a position of the mouth of fish.

It should further be noted that in this context the term "adjustment means" should be understood as any actuator arrangement, guide arrangement or any combination thereof or any similar adjustment device suitable for adjusting a position of a fish or mouth penetrating means in response to sensor reading of the mouth's position so the mouth penetrating means will hit the mouth of the fish when one or both are moved towards each other.

In an aspect of the invention, said sensor means comprises a camera.

Forming the sensor means to comprise a camera is advantageous in that such a vision sensor is capable of detecting the mouth of the fish even in difficult circumstances such as when there is great variations between the fish, in case of deform fish or variations in the handling of the fish.

In an aspect of the invention, said mouth penetrating means are mounted on displaceable slide means comprising means for displacing said mouth penetrating means towards said fish to push said mouth penetrating means into the mouth of said fish.

Moving the mouth penetrating means towards the fish (and not opposite) is advantageous in that it is simpler and more predictable to move the mouth penetrating means with great precision at least compared to attempting the move the fish with the same precision.

The term "slide means" should in this context be understood as any kind of carriage, guide, cart or similar slide suitable for guiding mouth penetrating means towards and into the mouth of fish.

In an aspect of the invention, said slide means comprises fixation means for fixating the head of said fish in relation to said mouth penetrating means.

Providing the slide means with fixation means capable of fixating the head of the fish is advantageous is that the size of the head of virtually all fish is—relative to the total size of the fish—of a size which enables a solid and firm grip on the fish. Furthermore, when fixating the fish at the head it is easier to ensure that the fixation device is not in the way when the fish abdomen is cut open and gutted and it is ensured that the fixation device does not squeeze on the entrails or affect their position, hereby making it easier to cut and gut the fish.

The term "fixation means" should in this context be understood as any kind of hook, clamp, cart or similar fixation device suitable for fixating the head of a fish.

In an aspect of the invention, said slide means are mounted on the moving part of a main conveyer of said fish processing machine.

By mounting the slide means on the moving part of the main conveyer, the slide means—and thus the mouth penetrating means and fixation means—follows the fish while it travels along the conveyer. This is advantageous in that the mouth of the fish is maintained open at all times in a well determined position hereby enabling that further processing in a simple manner can take place through the mouth of the fish.

In an aspect of the invention, said displacement means are mounted on a stationary part of said fish processing machine.

The displacement means are only used when the mouth penetrating means have to be placed in the mouth of the fish and since this only happens at a fixed location it is advantageous that the displacement means are mounted on a stationary part of said fish processing machine. Furthermore, mounting the displacement means to be stationary is advantageous in that it ensures simpler assembly and operation of the displacement means.

In an aspect of the invention, said adjustment means comprises means for adjusting the vertical position of said mouth penetrating means.

The mouth of the fish is usually placed relatively symmetrical in relation to the sides of the fish. Thus, if the fish is fixed symmetrically on the sides during penetration of the mouth penetrating means the sideward position of the mouth will substantially always be the same. However, the vertical position may vary much both between fish of the same size but obviously also between fish of different size. Thus, it is advantageous to make the adjustment means only adjust the vertical position of the mouth penetrating means in that it enables a much simpler design of the adjustment means.

In an aspect of the invention, said adjustment means are mounted on a stationary part of said fish processing machine and said adjustment means are formed separate from said displacement means.

The adjustment means are only used when the mouth penetrating means have to be placed in the mouth of the fish and since this only happens at a fixed location it is advantageous that the adjustment means are mounted on a stationary part of said fish processing machine. Furthermore, mounting the adjustment means to be stationary is advantageous in that it ensures simpler assembly and operation of the adjustment means.

Forming the adjustment means separate from the displacement mean is advantageous in that it enables a simpler design of both the adjustment means and the displacement means.

In an aspect of the invention, said fish processing machine comprises more than one mouth access providing means arranged to operate parallel and simultaneously on more than one fish.

By arranging the mouth access providing means to operate substantially simultaneously parallel side by side enables that more than one fish can be processed simultaneously which increases the capacity of the fish processing machine.

In an aspect of the invention, said fish processing machine further comprises side push means, for applying pressure to at least one side of said fish while said mouth penetrating means is penetrating said mouth.

Almost all fish will open their mouth when pressure is applied on the sides of the fish at the mouth. To aid and simplify the penetration of the mouth of the fish it is therefore advantageous to apply pressure to at least one side of the fish while the mouth penetrating means is penetrating the mouth.

In an aspect of the invention, said fish processing machine further comprises oesophagus severing means arranged to enter said fish through said mouth penetrating means.

Cutting the oesophagus through the mouth of the fish is advantageous in that it ensures that the oesophagus can be cut substantially at the root (in the throat of the fish) without risking damage to the viscera of the fish. And since to location of the mouth penetrating means is fixed and well-defined it is advantageous to enter the fish through the mouth penetrating means.

The invention further provides for a method enabling that fish can be processed through the mouth, said method comprising the steps of:

moving mouth penetrating means or said fish towards the other, detecting the location of the mouth of said fish, adjusting the position of said mouth penetrating means or the fish in relation to a detected location of the mouth of said fish, and bringing said mouth penetrating means and said fish together to place said mouth penetrating means inside said mouth of said fish.

Adjusting the position of the mouth penetrating means or the fish in relation to input regarding the actual position of the mouth is advantageous in that this ensures that the mouth penetrating means always hits and penetrates the mouth when the mouth penetrating means and the fish are brought together. Hereby high capacity and low error margin is ensured.

In an aspect of the invention, said mouth penetrating means is expanded inside said mouth of said fish.

Expanding the mouth penetrating means inside the mouth of the fish is advantageous in that it enables easy access through the mouth penetrating means and it ensures that the mouth is firmly fixed around the mouth penetrating means.

In an aspect of the invention, said mouth penetrating means is slid towards and into said mouth by displacement means and wherein said displacement means will at least aid in drawing said fish onto a main conveyer of a fish processing machine.

It is simpler and more easy to move the well-defined mouth penetrating means towards and into a stationary fish than the opposite and it is advantageous to use the displacement means move the fish since the displacement means are readily available.

In an aspect of the invention, said method is a method enabling that fish can be processed through the mouth in a fish processing machine according to any of the previously mentioned fish processing machines.

BRIEF DESCRIPTION OF THE DRAWINGS

The invention will be described in the following with reference to the figures in which FIG. 1. illustrates a fish processing machine, as seen from the front.

DETAILED DESCRIPTION OF THE DRAWINGS

Figure 1:
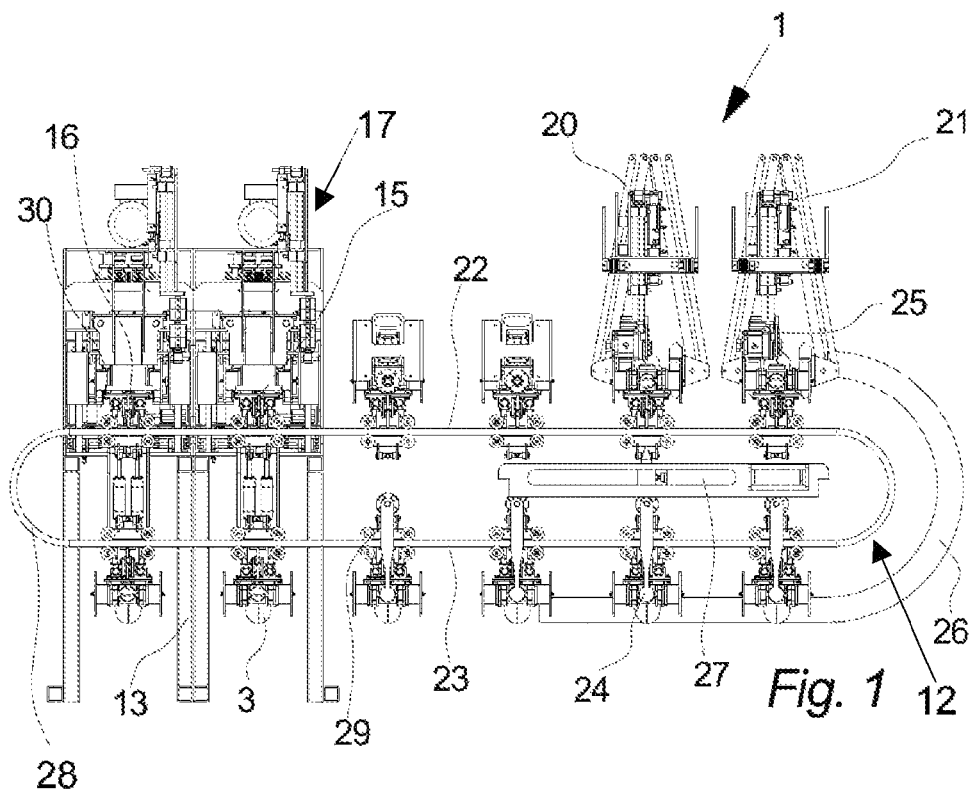
Figure 2:
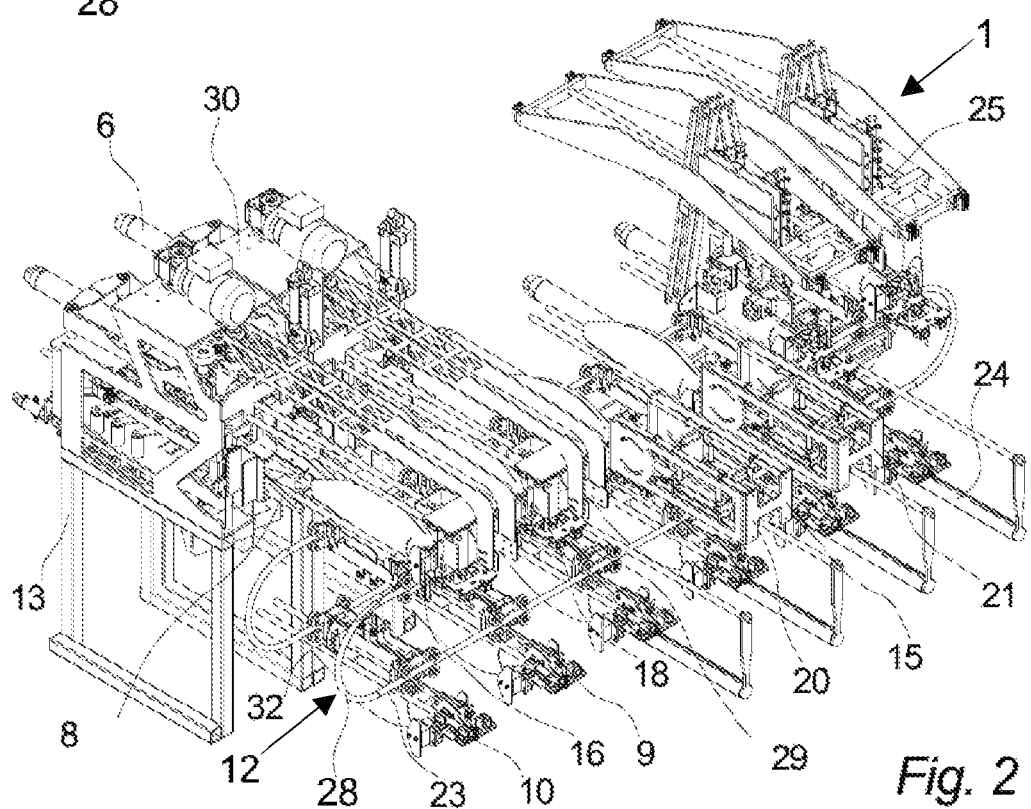
FIG. 2 illustrates the fish processing machine shown in FIG. 1, as seen in perspective.

FIG. 1 illustrates a fish processing machine 1, as seen from the front and FIG. 2 shows the fish processing machine 1 shown in FIG. 1, as seen in perspective.

In this embodiment the fish processing machine 1 comprises six fish processing stations 16, 17, each comprising two identical fish processing means 20, 21. However, in another embodiment the fish processing machine 1 could comprise another number of fish processing stations 16, 17 such as only one, two, three, four, five, eight or more and each of those fish processing stations 16, 17 could comprise another number of identical fish processing means 20, 21 such as three, four, five or more or each fish processing station 16, 17 could comprise only a single fish processing means 20, 21.

In this embodiment three of the fish processing stations 16, 17 are arranged at the topside 22 of the main conveyer 12 and the remaining three fish processing stations 16, 17 are arranged at the underside 23 of the main conveyer 12. However, in another embodiment the fish processing stations 16, 17 could be distributed differently on the main conveyer 12 i.e. in another embodiment all the fish processing stations 16, 17 could be arranged along the topside 22 of the main conveyer 12.

In this embodiment, all the fish processing means 20, 21 of all the fish processing stations 16, 17 are lined up so that the longitudinal direction of the fish 3 are arranged substantially perpendicular to the transport direction. In principle the fish 3 could also be arranged head to tail in an embodiment but if the fish 3 was so arranged through the fish processing machine 1, the capacity of the machine 1 would not be significantly increased if several substantially identical fish processing means 20, 21 were installed in that they would also have to be arranged in succession of each other.

However, in another embodiment the fish processing means 20, 21 of the fish processing stations 16, 17 could also be arranged parallel side by side at the main conveyer 12 so that the longitudinal direction of fish 3 was arranged substantially parallel with the transport direction of the main conveyer 12 i.e. if the mouth penetrating means 5 was arranged in parallel with the transport direction or arranged in continuous sets of e.g. two, three, four, five or more neighbouring mouth penetrating means 5 wherein the sets are arranged end to end. In such a configuration the identical fish processing means 20, 21 of a fish processing station 16, 17 would also be arranged side by side substantially perpendicular to the transport direction of the main conveyer 12 in a number corresponding to the number of mouth penetrating means 5 across the width of the conveyer 12.

By the term "longitudinal direction" is to be understood the direction defined by the length of the fish 3 i.e. the length measured from head of the fish 3 to the tail fin of the fish 3.

In this embodiment the first fish processing station 16 comprises mouth access providing means 2 i.e. means for placing mouth penetrating means 5 in the mouth 4 of the fish 3 and moving the fish 2 onto the main conveyer 12. The second fish processing station 17 comprises oesophagus severing means 15 for cutting the oesophagus free of the fish throat and the last fish processing station on the topside 22 of the main conveyer 12 comprises an abdomen cutting device 25 for cutting open the abdomen of the fish 3. The main conveyer 12 is in this embodiment provided with guide means 26 to help fixating the fish 3 through the bend between the topside 22 and the underside 23 of the main conveyer 12. The first fish processing station on the underside of the main conveyer 12 comprises a gutting device 24 for removing the entrails of the fish 3 and cutting and removing the blood vein by means of brushes, suction, scraping, cutting or any combination thereof. The second fish processing station on the underside of the main conveyer 12 is in this embodiment substantially identical with the first fish processing station on the underside and the last fish processing station on the underside of the main conveyer 12 (i.e. the station under the first fish processing station 16 on the topside 22) is where the fish 3 is removed from the fish processing machine 1.

However, in another embodiment the fish processing stations 16, 17 could be arranged in a different order, one or more of the fish processing stations 16, 17 could be omitted or replaced by other types of fish processing stations 16, 17 or further fish processing stations 16, 17 could be added.

In a fish processing machine 1 according to the present invention several different fish processing stations 16, 17 each comprising several identical fish processing means 20, 21 can process different fish 3 simultaneously, which increases the capacity of the machine 1 substantially without increasing the width of the machine 1. In comparison, if the fish 3 were arranged head to tail in a single row through the fish processing machine 1 and several substantially identical fish processing means 20, 21 were installed in succession of each other, the machine 1 would be so long that it would be practically impossible to install anywhere.

In this embodiment the main conveyer 12 comprises an equal number of displaceable carriages 29 comprising at least the mouth penetrating means 5 of the mouth access providing means 2. Each carriage 29 further comprises wheels engaging a conveyer guide 28 forming part of a stationary part 13 of the fish processing machine 1. In this embodiment the carriages 29 are linked so that if one carriage 29 is displaced all the carriages 29 will move. In this embodiment carriages 29 are not disclosed at the ends of the main conveyer 12 but in a real functioning embodiment further carriages 29 could be provided at these locations.

In another embodiment the mouth access providing means 2 could be connected directed directly to a conveyer belt, the carriages 29 could be formed differently or connected differently, the carriages 29 could merely push each other or the main conveyer 12 could be formed in numerous other ways.

In this embodiment the drive means 27 of the main conveyer 12 is a pair of pneumatic linear actuators operating in parallel and having a stroke corresponding to twice the distance between each carriage 29. At the end of the piston rods, the pneumatic linear actuators comprises means for engaging a carriage 29 from the bottom where after the pneumatic linear actuators will pull the carriage 29—and thereby all the carriages 29—forward so that all carriages 29 are moved two places forward i.e. since each fish processing station 16, 17 in this embodiment comprises two identical fish processing means 20, 21 each carriages 29 will be moved forward to a new fish processing station 16, 17.

However, in another embodiment the drive means 27 of the main conveyer 12 could be formed as a servomotor e.g. pulling a timing belt or the drive means 27 could be formed in a multitude of other way such as displacing mechanisms comprising chains, rack and gears, spindle drives, other types of electrical motors or motors having other power sources, other linear actuators such as electrical linear actuators or hydraulic cylinders or any combination hereof.

In this embodiment all the fish processing means 5 are positioned in an initial position 6 in which they await the first fish 3 to enter the machine 1, when the machine 1 is initially started up. At the first fish processing stations 16 the mouth access providing means 2 will be moved over to a supply conveyer 30 where the mouth penetrating means 5 will substantially simultaneously be placed in the mouth of two fish 3, the fish 3 head will be fixated by means of fixation means 10 and the fish 3 will be pushed and pulled onto the main conveyer 12 (this step will be explained in more details in relation with FIGS. 3-5). Once the fish 3 are in place on the main conveyer 12 inside the fish processing machine 1 the drive means 27 will move all the carriages 29 forward two places so that two new fish 3 can be placed in the two empty carriages 29 at the first fish processing stations 16. The first two fish 3 is then moved to the second fish processing stations 17 where—in this case—the oesophagus of the two fish 3 is severed simultaneously and simultaneously with the operation of the other fish processing stations. In this way the fish 3 travels through the fish processing machine 1 in steps so that every time the fish 3 moves forward it is moved into a new fish processing station 16, 17 where a new fish processing step can take place or be repeated.

In the embodiments disclosed in FIGS. 1 and 2 only the essential parts of the fish processing machine 1 is shown. A functioning embodiment the fish processing machine 1 would typically further comprise some sort of main frame—to which some or all the fish processing means 20, 21 was connected—, enclosure, further guides, exit conveyer etc.

It should be noted that on all illustrations the fish 3 is shown without a tail fin but in an embodiment of the invention the fish would comprise its tail all the way through the fish processing machine 1 or the tail could be removed in the fish processing machine 1.

Figure 3:
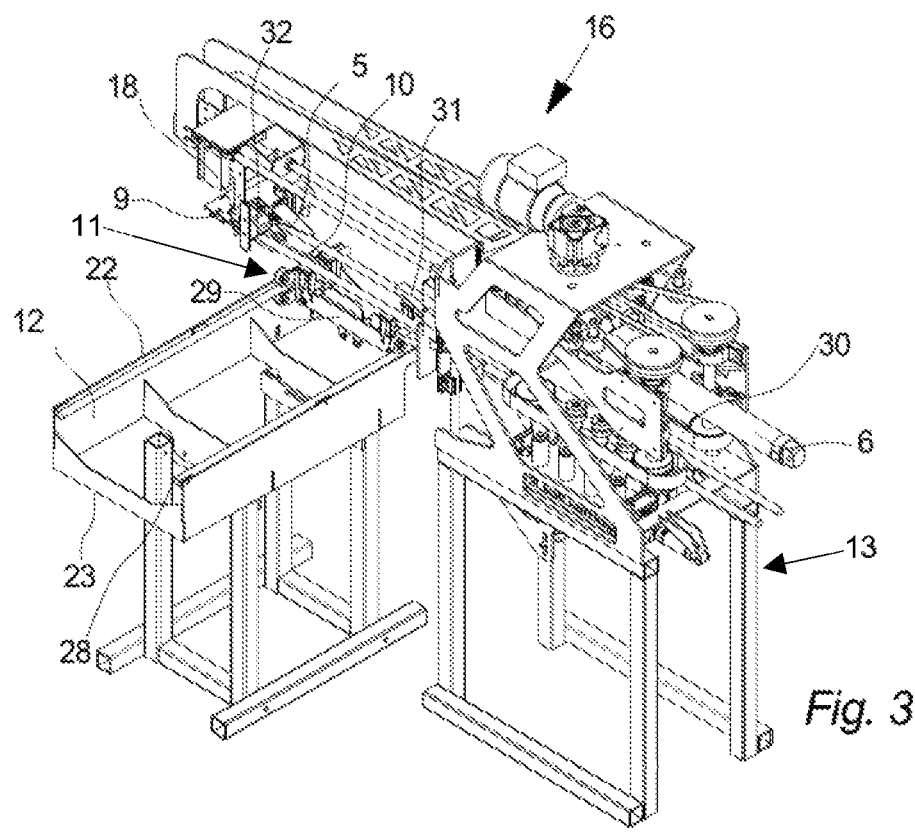
FIG. 3 illustrates mouth access providing means and supply conveyer of a fish processing machine, as seen in perspective.

FIG. 3 illustrates mouth access providing means 2 and supply conveyer 30 of a fish processing machine 1, as seen in perspective.

In this embodiment the mouth access providing means 2 comprises mouth penetrating means 5 in the form of a conical beak-like arrangement. The mouth penetrating means 5 are mounted on displaceable slide means 9 enabling that the mouth penetrating means 5 can be moved over to the supply conveyer 30 where it penetrates the mouth 4 of the fish 3 while being maintained in a closed state. Once the beak-like mouth penetrating means 5 have entered the mouth 4 of the fish 3 the mouth penetrating means 5 is opened to substantially form a cylinder extending into the mouth 4 of the fish 3. Making the mouth penetrating means 5 hollow is advantageous in that it enables that further fish processing can take place through the hollow mouth penetrating means 5 which in turn is advantageous in that the exact location of the mouth penetrating means 5 is always the same whereas all fish 3 are different in shape and size and it can therefore be difficult to detect a specific part of any given fish 3.

In another embodiment of the invention the mouth penetrating means 5 could be formed differently e.g. to better suit the shape of the mouth 4 of the fish 3, to better suit fish processing means 20, 21 having to operate through the mouth penetrating means 5, to ensure better fixation of the fish 3, to ensure easier penetration of the fish's mouth 4 or other or any combination thereof. I.e. the mouth penetrating means 5 could be formed as a cylinder without the expanding part, the expanding part could be formed by further moving parts and other.

In this embodiment fixation means 10 will also engage the head of the fish 3 to ensure that the fish 3 is securely fixed to the mouth penetrating means 5 and that the mouth penetrating means 5 stays inside the mouth of the fish 3. While the supply conveyer 30 moves the fish 3 forward the displacement means 6 pulls the slide means 9 and thereby the fish 3 into the fish processing machine 1.

However, in another embodiment the mouth penetrating means 5 could be stationary (regarding transverse motion) and the fish 3 could be displaced onto the mouth penetrating means 5.

In this embodiment the displacement means 6 are formed as a pneumatic cylinder mounted on the supply conveyer 30 i.e. on a stationary part of the fish processing machine 1. In another embodiment the displacement means 6 could be another type of linear actuator, it could comprise rack and pinion, motors, timing belts or other or any combination thereof.

Figure 4:
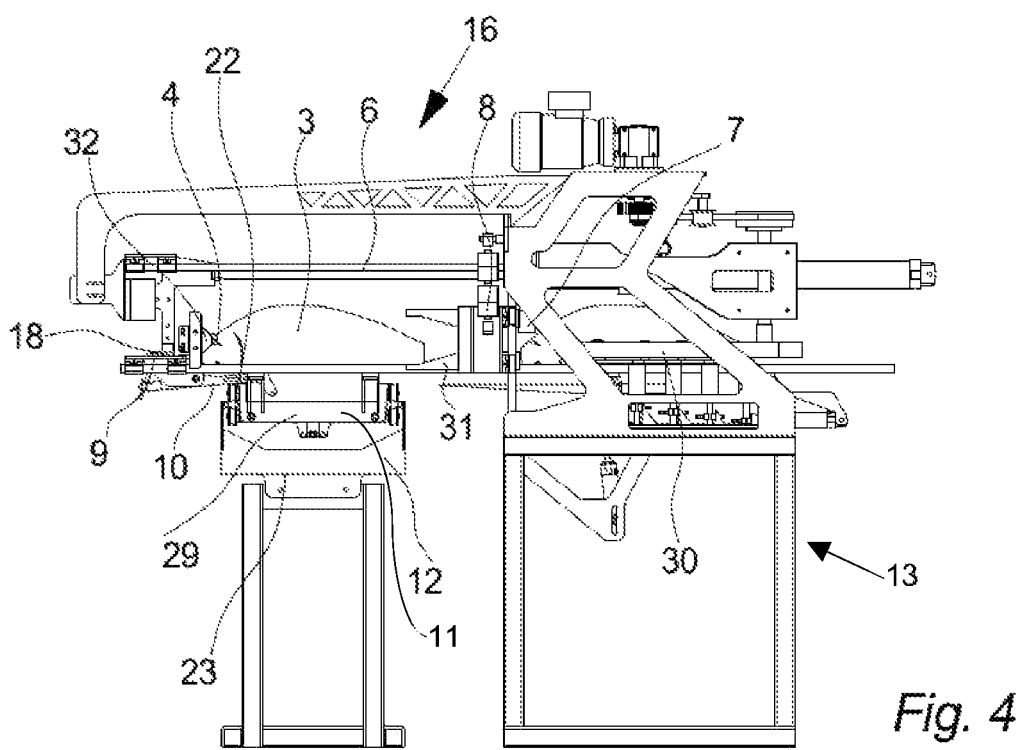
FIG. 4 illustrates mouth access providing means engaging a fish, as seen from the side.

In this embodiment the slide means 9 of the mouth access providing means 2 also comprises engagement means 18 for connecting the slide means 9 to the displacement means 6 when the specific carriages 29 are in place in front of the supply conveyer 30. I.e. in this embodiment the slide means 9 of the mouth access providing means 2 are locked towards transverse motion when it is not engaged by the displacement means 6. FIG. 4 illustrates mouth access providing means 2 engaging a fish 3, as seen from the side.

As previously explained all fish 3 are different in shape and size and it can therefore be difficult to ensure that the mouth penetrating means 5 always hits the mouth 4 of the fish 3. Thus, in this embodiment the supply conveyer 30 is provided with sensor means 7 for detecting the exact location of the mouth 4 of the specific fish 3 lined up in the supply conveyer 30. In this embodiment the sensor means 7 is a camera.

In this embodiment the mouth access providing means 2 is also provided with adjustment means 8 comprising a slide guide 31 arranged on the supply conveyer 30. This slide guide's 31 vertical position is adjusted in relation to the detections of the sensor means 7 so that when the slide means 9 is moved towards the fish 3, the wedge means 32 of the slide means 9 will engage the slide guide 31 and thereby adjust the vertical position of the mouth penetrating means 5 accordingly to fit substantially the exact height of the mouth 4 of the fish 3.

However, in another embodiment the adjustment means 8 could comprise means for directly adjusting the position of the mouth of the fish 3 in relation to the mouth penetrating means 5 or vice versa e.g. by means of a motor, a linear actuator or similar changing the vertical position of the mouth penetrating means 5 directly on the slide means 9 (which could require such means mounted on every carriage 29) or directly changing the vertical position of the fish 3 in relation to output from the sensor means 7.

Since most fish 3 are symmetrical (around a vertical centre plane of a normally orientated fish 3) only the vertical position of the mouth penetrating means 5 is adjusted in this embodiment but in another embodiment the adjustment means 8 could also comprise means for adjusting the horizontal position of the mouth penetrating means 5 and/or the fish 3 before the mouth penetrating means 5 engages the fish 3.

In this embodiment the slide guide 31 is formed as a V and the corresponding wedge means 32 is also substantially V shaped but in another embodiment the slide guide 31 and the wedge means 32 could be shaped as corresponding wedges, circle segments or in another way allowing the position of one of them to be adjusted to the position of the other.

In this embodiment the vertical position of the slide guide 31 is adjusted by means of linear cylinders capable of correcting the vertical position of the slide guide 31 in response to an output from the sensor means 7 (e.g. through further signal processing in a PLC, a PC or other signal processing equipment) but in another embodiment the vertical position could be adjusted by means of a rack and pinion arrangement, inflatable bellows or balloon arrangements, an electrical motor or a similar system.

Figure 5:
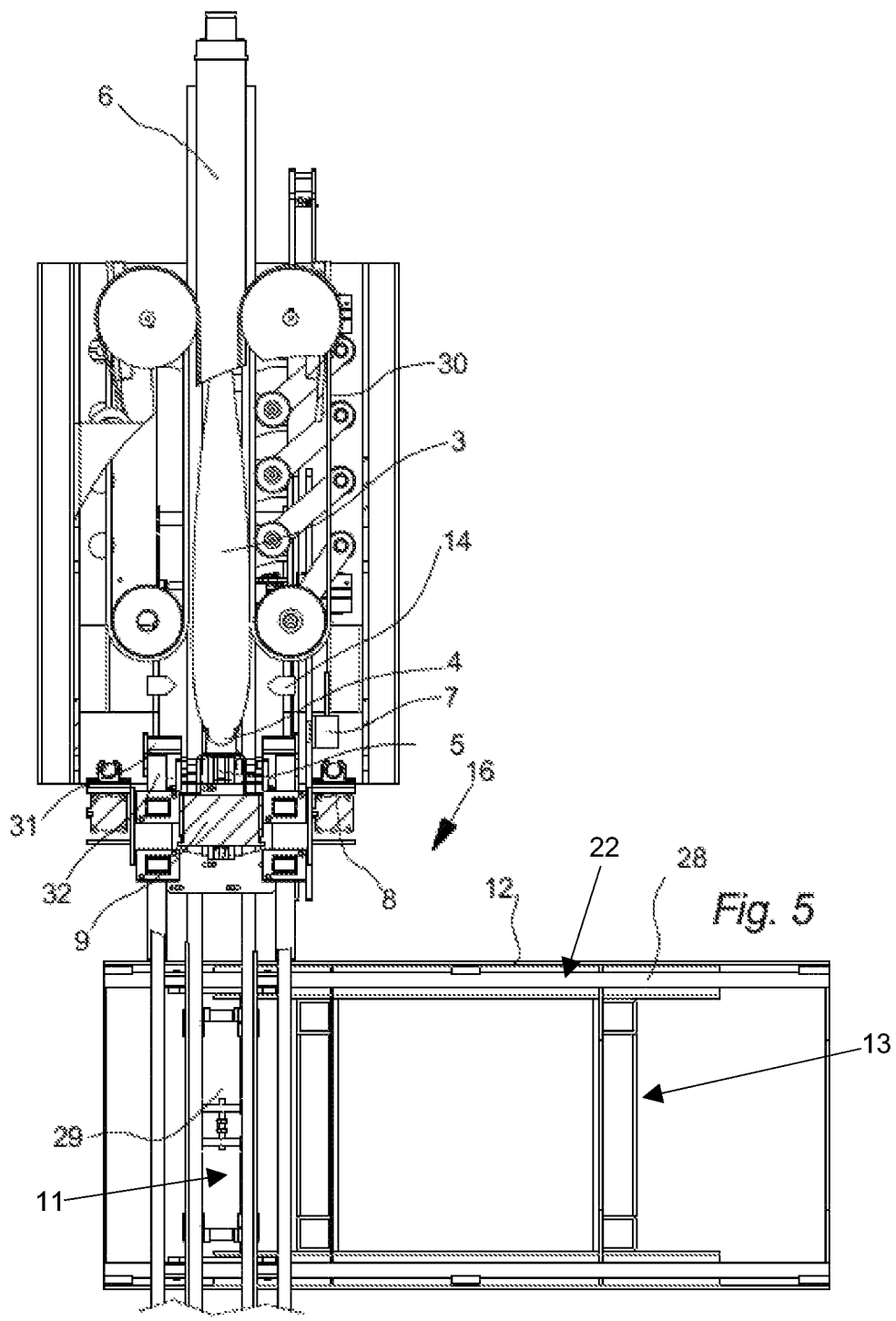
FIG. 5 illustrates a cross section through mouth access providing means, as seen from the top.

FIG. 5 illustrates a cross section through mouth access providing means 2, as seen from the top.

To aid in the process of placing the mouth penetrating means 5 in the mouth 4 of the fish 3 the supply conveyer 30 is in this embodiment provided with push means 14 arranged to press on the sides of the fish 3 at the fish's head during the penetration process. Applying pressure to the sides of the fish's head will make the fish's mouth 4 open at least a bit hereby increasing the chance of the mouth penetrating means 5 hitting and sliding into the mouth 4 of the fish 3.

Figure 6:
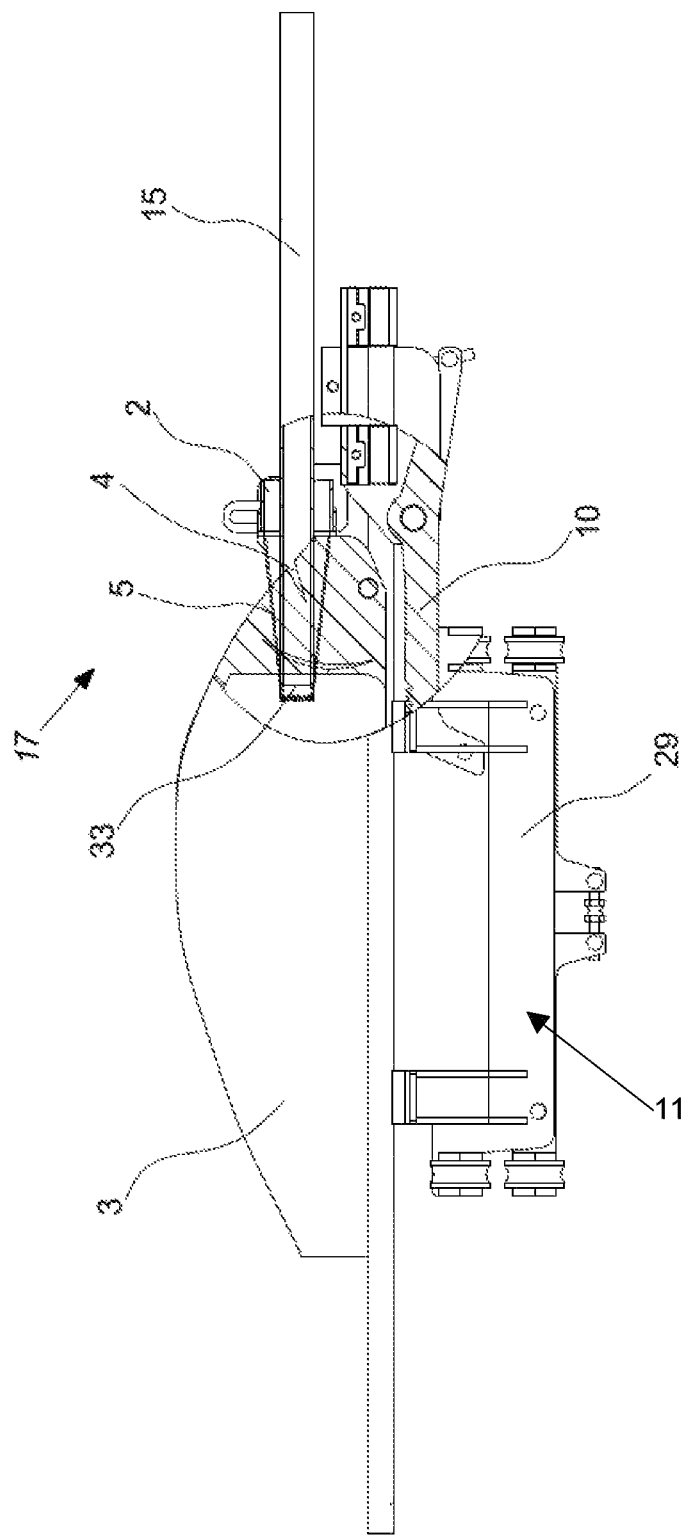
FIG. 6 illustrates oesophagus severing means, as seen from the side.

FIG. 6 illustrates oesophagus severing means 15, as seen from the side.

In this embodiment one of the fish processing stations 16, 17 comprises oesophagus severing means 15. In this embodiment of the invention the oesophagus severing means 15 are formed as a rotating cylinder having a sharp edge 33 at the front end forming a cylindrical knife. Thus when the rotating oesophagus severing means 15 are entered into the fish 3 through the mouth penetrating means 5 the oesophagus severing means 15 will cut the oesophagus free of the fish's throat substantially without leaving any part of the oesophagus remaining attached to the fish 3. In this embodiment the cylinder is hollow so that vacuum can be established inside the cylinder to pull the throat end of the oesophagus towards the sharp edge 33. To prevent that the oesophagus (or other objects) is sucked into the cylinder the cylinder could be provided with a grate, lattice or similar at the front end.

In this embodiment only the oesophagus severing process is performed through the hollow mouth penetrating means 5 but in another embodiment further processing could take place through the mouth penetrating means 5. I.e. in an embodiment substantially all fish processing could take place through the mouth penetrating means 5 so that the abdomen of the fish 3 would not have to be cut open.

Figure 7:
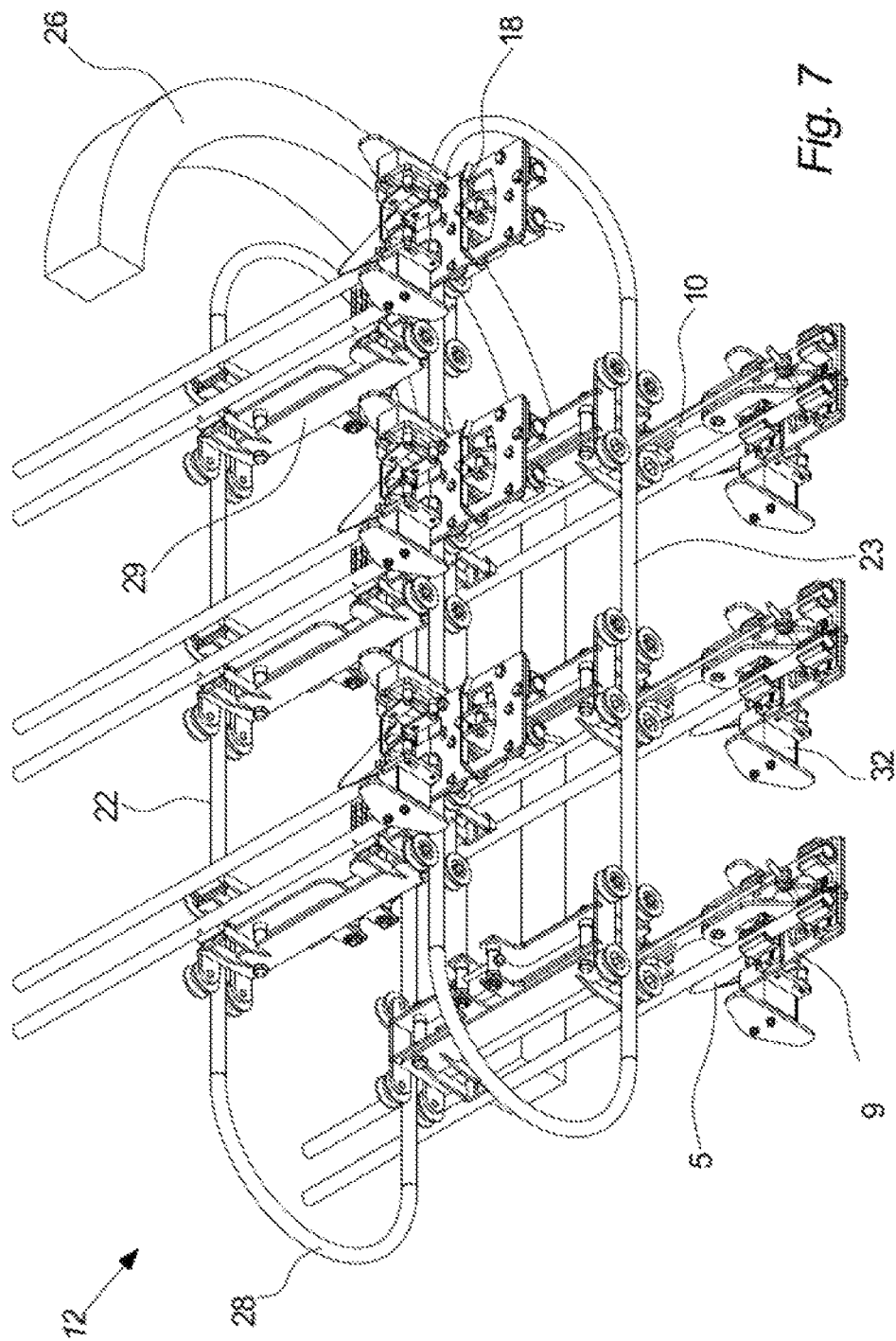
FIG. 7 illustrates a main conveyer comprising a plurality of mouth penetrating means, as seen in perspective.

FIG. 7 illustrates a main conveyer 12 comprising a plurality of mouth penetrating means 5, as seen in perspective.

The invention has been exemplified above with reference to specific examples of mouth access providing means 2, fish processing means 20, 21, sensor means 7 and other. However, it should be understood that the invention is not limited to the particular examples described above but may be designed and altered in a multitude of varieties within the scope of the invention as specified in the claims.

LIST

1. Fish processing machine
2. Mouth access providing means
3. Fish
4. Mouth of fish
5. Mouth penetrating means
6. Displacement means
7. Sensor means
8. Adjustment means
9. Displaceable slide means
10. Fixation means
11. Moving part of main conveyer
12. Main conveyer
13. Stationary part of fish processing machine
14. Push means
15. Oesophagus severing means
16. First fish processing station
17. Second fish processing station
18. Engagement means
19.
20. First fish processing means
21. Second fish processing means
22. Topside of main conveyer
23. Underside of main conveyer
24. Gutting device
25. Abdomen cutting device
26. Guide means
27. Drive means
28. Conveyer guide
29. Carriage
30. Supply conveyer
31. Slide guide
32. Wedge means
33. Sharp edge

The invention claimed is:

1. A fish processing machine comprising mouth access providing means enabling that a fish can be processed through a mouth of said fish, said mouth access providing means including,
    mouth penetrating means for penetrating the mouth of said fish,
    displacement means for displacing said mouth penetrating means or said fish in relation to each other to place said mouth penetrating means in the mouth of said fish,
    sensor means for detecting a location of the mouth of said fish, and
    adjustment means for adjusting a position of said mouth penetrating means or said fish in relation to output from said sensor means.

2. A fish processing machine according to claim 1, wherein said sensor means comprises a camera.

3. A fish processing machine claim 1, wherein said mouth penetrating means are mounted on displaceable slide means comprising means for displacing said mouth penetrating means towards said fish to push said mouth penetrating means into the mouth of said fish.

4. A fish processing machine according to claim 3, wherein said slide means comprises fixation means for fixating a head of said fish in relation to said mouth penetrating means.

5. A fish processing machine according to claim 3, wherein said slide means are mounted on a moving part of a main conveyer of said fish processing machine.

6. A fish processing machine claim 1, wherein said displacement means are mounted on a stationary part of said fish processing machine.

7. A fish processing machine claim 1, wherein said adjustment means comprises means for adjusting the vertical position of said mouth penetrating means.

8. A fish processing machine claim 1, wherein said adjustment means are mounted on a stationary part of said fish processing machine and said adjustment means are formed separate from said displacement means.

9. A fish processing machine claim 1, wherein said fish processing machine comprises more than one mouth access providing means arranged to operate parallel and simultaneously on more than one fish.

10. A fish processing machine claim 1, wherein said fish processing machine further comprises side push means, for applying pressure to at least one side of said fish while said mouth penetrating means is penetrating said mouth.

11. A fish processing machine claim 1, wherein said fish processing machine further comprises oesophagus severing means arranged to enter said fish through said mouth penetrating means.

12. A method enabling that fish can be processed through a mouth, said method comprising the steps of:
    moving mouth penetrating means or said fish towards the other,
    detecting a location of the mouth of said fish, adjusting a position of said mouth penetrating means or the fish in relation to a detected location of the mouth of said fish, and bringing said mouth penetrating means and said fish together to place said mouth penetrating means inside said mouth of said fish.

13. A method according to claim 12, wherein said mouth penetrating means is expanded inside said mouth of said fish.

14. A method according to claim 12, wherein said mouth penetrating means is slid towards and into said mouth by displacement means and wherein said displacement means will at least aid in drawing said fish onto a main conveyer of a fish processing machine.

15. A method according to claim 12, wherein said method is a method enabling that fish can be processed through the mouth in a fish processing machine.

\* \* \* \* \*

UNITED STATES PATENT AND TRADEMARK OFFICE
CERTIFICATE OF CORRECTION

| | |
|---|---|
| PATENT NO. | : 9,622,493 B2 |
| APPLICATION NO. | : 15/030167 |
| DATED | : April 18, 2017 |
| INVENTOR(S) | : Ivan Kristensen |

It is certified that error appears in the above-identified patent and that said Letters Patent is hereby corrected as shown below:

Column 10, Line 29, Claim 3, please insert --according to-- before "claim 1"
Column 10, Line 41, Claim 6, please insert --according to-- before "claim 1"
Column 10, Line 44, Claim 7, please insert --according to-- before "claim 1"
Column 10, Line 47, Claim 8, please insert --according to-- before "claim 1"
Column 10, Line 51, Claim 9, please insert --according to-- before "claim 1"
Column 10, Line 55, Claim 10, please insert --according to-- before "claim 1"
Column 10, Line 59, Claim 11, please insert --according to-- before "claim 1"

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*